United States Patent
Yang et al.

(10) Patent No.: US 10,014,786 B2
(45) Date of Patent: Jul. 3, 2018

(54) FLYBACK POWER CONVERTER AND SYNCHRONOUS RECTIFICATION (SR) SWITCH CONTROL CIRCUIT AND POWER SWITCH CONTROL CIRCUIT THEREOF

(71) Applicant: RICHTEK TECHNOLOGY CORPORATION, Zhubei, Hsinchu (TW)

(72) Inventors: Ta-Yung Yang, Taoyuan (TW); Tzu-Chen Lin, Changhua (TW); Bing Zeng, Chongqing (CN); Li-Di Luo, Taichung (TW)

(73) Assignee: RICHTEK TECHNOLOGY CORPORATION, Zhubei, Hsinchu (*) Notice: Subject to any disclaimer, the term of this patent is extended or adjusted under 35 U.S.C. 154(b) by 0 days.

(21) Appl. No.: 15/809,595

(22) Filed: Nov. 10, 2017

(65) Prior Publication Data
US 2018/0138818 A1    May 17, 2018

Related U.S. Application Data

(60) Provisional application No. 62/421,945, filed on Nov. 14, 2016, provisional application No. 62/486,784, filed on Apr. 18, 2017.

(30) Foreign Application Priority Data

Aug. 1, 2017    (TW) .............................. 106125968 A

(51) Int. Cl.
*H02M 3/335* (2006.01)

(52) U.S. Cl.
CPC .... *H02M 3/33523* (2013.01); *H02M 3/33592* (2013.01)

(58) Field of Classification Search
CPC .......... H02J 7/1446; H02J 7/245; Y02T 10/92
See application file for complete search history.

(56) References Cited

U.S. PATENT DOCUMENTS

2010/0182806 A1*    7/2010    Garrity ............. H02M 3/33569
363/21.14

* cited by examiner

*Primary Examiner* — Adolf Berhane
*Assistant Examiner* — Afework Demisse
(74) *Attorney, Agent, or Firm* — Tung & Associates

(57) ABSTRACT

A flyback power converter includes a transformer, a power switch, a power switch control circuit, a synchronous rectification (SR) switch, an SR switch control circuit, and a signal coupler circuit. The signal coupler circuit includes a primary port and a secondary port, wherein the primary port is electrically connected to the power switch control circuit, and the secondary port is electrically connected to the SR switch control circuit. The primary port and the secondary port receive different signals generated by the power switch control circuit and the SR switch control circuit respectively, and the signal coupler circuit senses and converts the different signals to generate corresponding converted signals at the secondary port and the primary port respectively in different and non-overlapping time periods, without direct contact or direct connection between the primary side and the secondary side of the transformer.

43 Claims, 6 Drawing Sheets

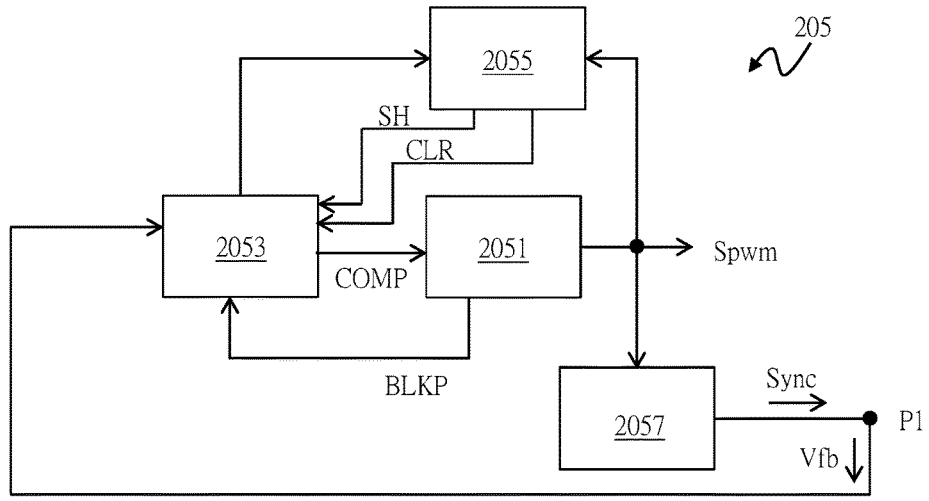
Fig. 8
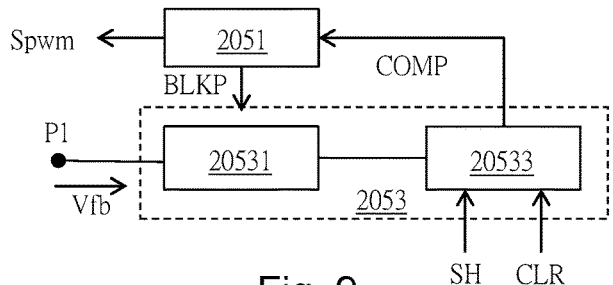
Fig. 9
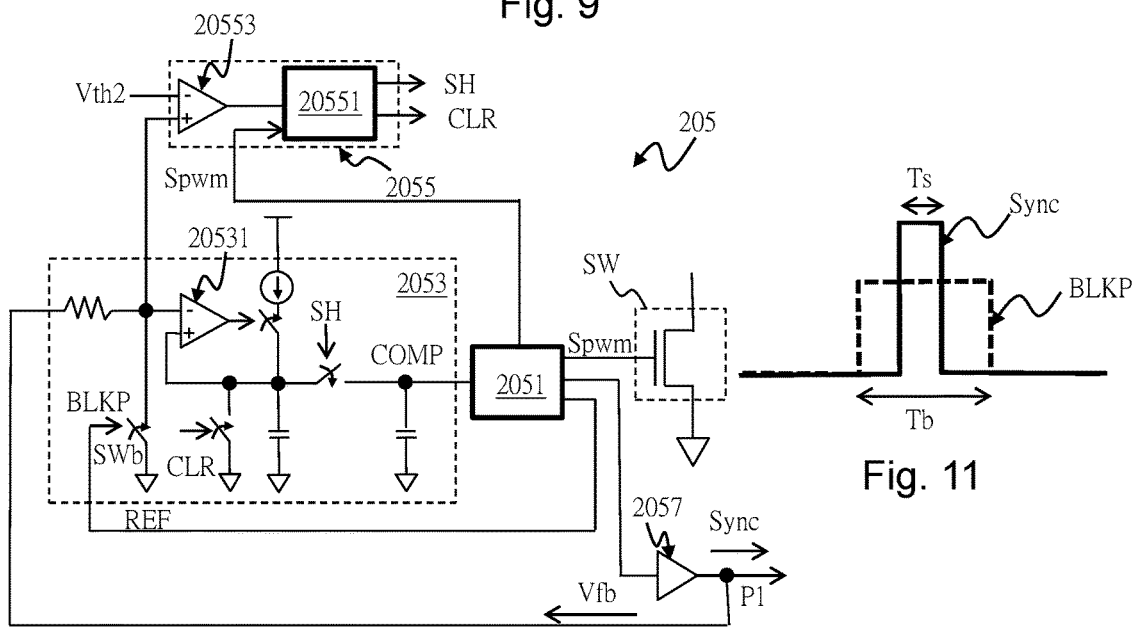
Fig. 10
Fig. 11

FLYBACK POWER CONVERTER AND SYNCHRONOUS RECTIFICATION (SR) SWITCH CONTROL CIRCUIT AND POWER SWITCH CONTROL CIRCUIT THEREOF

CROSS REFERENCE

The present invention claims priorities to U.S. 62/421,945, filed on Nov. 14, 2016; U.S. 62/486,784, filed on Apr. 18, 2017; and TW 106125968, filed on Aug. 1, 2017.

BACKGROUND OF THE INVENTION

Field of Invention

The present invention relates to a flyback power converter, and a synchronous rectification (SR) switch control circuit and a power switch control circuit thereof; particularly, it relates to such flyback power converter and SR switch control circuit and power switch control circuit thereof, wherein the flyback power converter includes a signal coupler circuit coupled between a primary side and a secondary side of a transformer, wherein the signal coupler circuit senses and converts a first signal of the primary side and transmits the converted first signal to the secondary side, and senses and converts a second signal of the secondary side and transmits the converted second signal to the primary side, with same ports in different and non-overlapping time periods.

Description of Related Art

FIG. 1 shows a schematic diagram of a conventional flyback power converter 100. As shown in FIG. 1, a rectifier circuit 101 rectifies an alternating current (AC) voltage Vac to generate an input voltage Vin. The rectifier circuit 101 is for example a bridge rectifier circuit. A transformer 102 includes a primary winding W1 and a secondary winding W2. The secondary winding W2 is electrically connected to a ground level GND, and the primary winding W1 is electrically connected to a reference level REF. The primary winding W1 of the transformer 102 receives the input voltage Vin. A power switch SW controls a conduction time of the primary winding W1, whereby the input voltage Vin is converted to an output voltage Vout generated at a secondary winding W2 of the transformer 102. The flyback power converter 100 includes the aforementioned transformer 102, a power switch SW, an opto-coupler circuit 104, a pulse width modulation (PWM) controller 105, a current sense circuit 106, a synchronous rectification (SR) control circuit 107, and an SR switch circuit 108. The PWM controller 105 generates a PWM signal according to a current sense signal CS, which is generated by the current sense circuit 106, and a feedback signal COMP, which is generated by the opto-coupler circuit 104, and a switching signal GATE is generated according to the PWM signal to operate the power switch SW of the flyback power converter 100, for converting the input voltage Vin to the output voltage Vout. The current sense circuit 106 generates the current sense signal CS according to a current flowing through the power switch SW.

Still referring to FIG. 1, the secondary winding W2 of the flyback power converter 100 is electrically connected to the SR switch circuit 108. The SR control circuit 107 controls the SR switch circuit 108 according to a voltage drop across the SR switch circuit 108 and a synchronous signal SYNC, wherein the voltage drop across the SR switch circuit 108 indicates a current flowing through the secondary winding W2. As thus, the secondary winding W2 is controlled to be conductive as the primary winding W1 is not conductive, for converting the input voltage Vin to the output voltage Vout. However if the secondary winding W2 is conductive while the primary winding W1 is conductive, a short through condition occurs. This short through condition will cause damages to the flyback power converter 100.

The PWM control circuit 105 generates a notice signal PLS, and a coupler circuit 103 receives the notice signal PLS to generate a synchronous signal SYNC, for confirming that the SR switch circuit 108 is nonconductive before turning ON the power switch SW. In this arrangement, the opto-coupler circuit 104 and the coupler circuit 103 are two different circuits; the opto-coupler circuit 104 delivers information related to the output voltage Vout at the secondary side to the PWM controller 105 at the primary side, and the coupler circuit 103 delivers information related to the power switch control signal GATE at the primary side to the SR control circuit 107 at the secondary side. The arrangement of the opto-coupler circuit 104 and the coupler circuit 103 being two different circuits causes the size of the flyback power converter 100 to be large.

In view of the above, the present invention proposes a flyback power converter, and a synchronous rectification (SR) switch control circuit and a power switch control circuit thereof, wherein the flyback power converter includes a signal coupler circuit coupled between a primary side and a secondary side, wherein the signal coupler circuit senses and converts a first signal of the primary side and transmits the converted first signal to the secondary side, and senses and converts a second signal of the secondary side and transmits the converted the second signal to the primary side, with same ports in different and non-overlapping time periods.

SUMMARY OF THE INVENTION

From one perspective, the present invention provides a flyback power converter, comprising: a transformer, which includes: a primary winding, configured to operably receive an input voltage; and a secondary winding, configured to operably generate an output voltage and an output current; a power switch, which is coupled to the primary winding, and configured to operably control a conduction time of the primary winding; a power switch control circuit, which is located at a primary side of the transformer, and configured to operably generate a power switch control signal according to a coupled feedback signal, to control the power switch, and configured to operably generate a synchronous rectification (SR) pulse signal; a synchronous rectification (SR) switch, which is coupled to the secondary winding, and configured to operably control a conduction time of the secondary winding in correspondence to a nonconductive time of the primary winding; a synchronous rectification (SR) switch control circuit, which is coupled to the SR switch and located at a secondary side of the transformer, and configured to operably receive a coupled SR signal to control the SR switch and configured to operably generate a feedback pulse signal according to the output voltage or the output current in a normal operation mode; and a signal coupler circuit, which is coupled between the SR switch control circuit and the power switch control circuit, and is configured to operably sense the SR pulse signal to generate the coupled SR signal by non-contact coupling without direct connection between the SR pulse signal and the coupled SR signal, and sense the feedback pulse signal to generate the coupled feedback signal by non-contact coupling without direct connection between the feedback pulse signal and the coupled feedback signal; wherein the signal coupler circuit includes a primary port and a secondary port; wherein the primary port is located at the primary side of the transformer, and the secondary port is located at the secondary side of the transformer; wherein the primary port receives the SR pulse signal and generates the coupled feedback signal indifferent and non-overlapping time periods respectively, and the secondary port generates the coupled SR signal and receives the feedback pulse signal in said different and non-overlapping time periods respectively.

In one preferable embodiment, the signal coupler circuit includes a pulse transformer or a pulse opto-coupler, wherein input signals and output signals of the pulse transformer and the pulse opto-coupler are signals in a pulse form.

In one preferable embodiment, the SR pulse signal includes a synchronous rectification (SR) pulse and the coupled SR signal is related to the SR pulse; and the SR switch control circuit turns OFF the SR switch according to the coupled SR signal in an operation period, such that the SR switch is turned OFF before the power switch is turned ON in the operation period.

In one preferable embodiment, the SR switch control circuit determines that the power switch is nonconductive according to a secondary winding current flowing through the secondary winding, an SR switch current flowing through the SR switch, a voltage drop across the secondary winding, or a voltage drop across the SR switch in an operation period.

In one preferable embodiment, the feedback pulse signal includes at least one feedback pulse, wherein the feedback pulse indicates the output voltage by one or more of followings: a feedback pulse level, a feedback pulse time period, and a number of the feedback pulse(s); and a power switch current flowing through the power switch is controlled in correspondence to the feedback pulse.

In one preferable embodiment, the SR pulse signal includes an SR pulse, and the feedback pulse signal includes a feedback pulse; wherein pulse time periods of the SR pulse and the feedback pulse are both shorter than 1 micro-second.

In one preferable embodiment, the feedback pulse signal includes a feedback pulse, wherein the feedback pulse is generated after a predetermined synchronous period posterior to an SR pulse of the SR pulse signal.

In the aforementioned embodiment, preferably, after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

In the aforementioned embodiment, the synchronous threshold period is preferably related to the output voltage.

In one preferable embodiment, the SR pulse signal includes an SR pulse, wherein the SR pulse is generated after a predetermined feedback period posterior to a feedback pulse of the feedback pulse signal generated in an operation period.

In the aforementioned embodiment, preferably, after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with a synchronous period, till the SR switch control circuit generates the following feedback pulse.

In the aforementioned embodiment, the predetermined feedback period is preferably related to the output voltage.

In one preferable embodiment, the SR switch control circuit includes: an output voltage sampler circuit, configured to operably sample the output voltage, to generate an output voltage sample signal; a feedback pulse signal generation circuit, which is coupled between the output voltage sampler circuit and the secondary port, and is configured to operably generate the feedback pulse signal according to the output voltage sample signal; an SR comparator, which is coupled to the secondary port, and is configured to operably generate a synchronous comparison signal according to the coupled SR signal and a synchronous reference signal; an SR timer circuit, which is coupled to the SR comparator, and is configured to operably generate a predetermined synchronous period timing signal by counting a predetermined synchronous period according to the synchronous comparison signal; and an SR switch control signal generation circuit, which is coupled to the SR comparator and the SR switch, and is configured to operably generate an SR switch control signal according to the synchronous comparison signal, to control the SR switch.

In one preferable embodiment, the power switch control circuit includes: a power switch control signal generation circuit, which is coupled to the power switch, and is configured to operably generate the power switch control signal according to a sampling feedback signal; a feedback signal sample and hold (S/H) circuit, which is coupled between the power switch control signal generation circuit and the primary port, and is configured to operably generate the sampling feedback signal according to coupled feedback signal; and a feedback timer circuit, which is coupled to the power switch control signal generation circuit and the feedback signal S/H circuit, and is configured to operably generate a sampling signal and a clear signal according to the power switch control signal and the coupled feedback signal; wherein the feedback signal S/H circuit converts the coupled feedback signal to the sampling feedback signal according to the sampling signal and the clear signal.

In the aforementioned embodiment, the feedback signal S/H circuit preferably includes: a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and a sampling feedback signal generation circuit, which is coupled between the blanking circuit and the power switch control signal generation circuit, and is configured to operably generate the sampling feedback signal according to the coupled feedback signal, the clear signal, and the sampling signal.

From another perspective, the present invention provides a synchronous rectification (SR) switch control circuit of a flyback power converter, wherein the flyback power converter includes a transformer including a primary winding for receiving an input voltage, and a secondary winding for generating an output voltage and an output current; a power switch, which is coupled to the primary winding, the power switch controlling a conduction time of the primary winding; a power switch control circuit, which is located at a primary side of the transformer, the power switch control circuit generating a power switch control signal according to a coupled feedback signal, to control the power switch, and generating a synchronous rectification (SR) pulse signal; a synchronous rectification (SR) switch, which is coupled to the secondary winding, the SR switch controlling a conduction time of the secondary winding in correspondence to a nonconductive time of the primary winding; the SR switch control circuit, which is coupled to the SR switch and located at a secondary side of the transformer, the SR switch control circuit receiving a coupled SR signal to control the SR switch and generating a feedback pulse signal according to the output voltage or the output current in a normal operation mode; and a signal coupler circuit, which is coupled between the SR switch control circuit and the power switch control circuit, the signal coupler circuit sensing the SR pulse signal to generate the coupled SR signal by non-contact coupling without direct connection between the SR pulse signal and the coupled SR signal, and sensing the feedback pulse signal to generate the coupled feedback signal by non-contact coupling without direct connection between the feedback pulse signal and the coupled feedback signal; wherein the signal coupler circuit includes a primary port and a secondary port; wherein the primary port is located at a primary side of the transformer, and the secondary port is located at the secondary side; wherein the primary port receives the SR pulse signal and generates the coupled feedback signal in different and non-overlapping time periods respectively, and the secondary port generates the coupled SR signal and receives the feedback pulse signal in said different and non-overlapping time periods respectively; the SR switch control circuit comprising: an output voltage sampler circuit, configured to operably sample the output voltage, to generate an output voltage sample signal; a feedback pulse signal generation circuit, which is coupled between the output voltage sampler circuit and the secondary port, and is configured to operably generate the feedback pulse signal according to the output voltage sample signal; an SR comparator, which is coupled to the secondary port, and is configured to operably generate a synchronous comparison signal according to the coupled SR signal and a synchronous reference signal; an SR timer circuit, which is coupled to the SR comparator, and is configured to operably generate a predetermined synchronous period timing signal by counting a predetermined synchronous period according to the synchronous comparison signal; and an SR switch control signal generation circuit, which is coupled to the SR comparator and the SR switch, and is configured to operably generate an SR switch control signal according to the synchronous comparison signal, to control the SR switch.

In one preferable embodiment, the signal coupler circuit includes a pulse transformer or a pulse opto-coupler, wherein input signals and output signals of the pulse transformer and the pulse opto-coupler are signals in a pulse form.

In one preferable embodiment, the SR pulse signal includes a synchronous rectification (SR) pulse and the coupled SR signal is related to the SR pulse, wherein the SR switch control circuit turns OFF the SR switch according to the coupled SR signal in an operation period, such that the SR switch is turned OFF before the power switch is turned ON in the operation period.

In one preferable embodiment, the SR switch control circuit determines that the power switch is nonconductive according to a secondary winding current flowing through the secondary winding, an SR switch current flowing through the SR switch, a voltage drop across the secondary winding, or a voltage drop across the SR switch.

In one preferable embodiment, the feedback pulse signal includes at least one feedback pulse, wherein the feedback pulse indicates the output voltage by one or more of followings: a feedback pulse level, a feedback pulse time period, and a number of the feedback pulse(s); and wherein a power switch current flowing through the power switch is controlled in correspondence to the feedback pulse.

In one preferable embodiment, the SR pulse signal includes an SR pulse, and the feedback pulse signal includes a feedback pulse; wherein pulse time periods of the SR pulse and the feedback pulse are both shorter than 1 micro-second.

In one preferable embodiment, the feedback pulse signal includes a feedback pulse, wherein the feedback pulse is generated after a predetermined synchronous period posterior to an SR pulse of the SR pulse signal.

In the aforementioned embodiment, after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

In the aforementioned embodiment, the synchronous threshold period is preferably related to the output voltage.

In one preferable embodiment, the SR pulse signal includes an SR pulse, wherein the SR pulse is generated after a predetermined feedback period posterior to a feedback pulse of the feedback pulse signal generated in an operation period.

In the aforementioned embodiment, after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with a synchronous period, till the SR switch control circuit generates the following feedback pulse.

In the aforementioned embodiment, the predetermined feedback period is preferably related to the output voltage.

In one preferable embodiment, the power switch control circuit includes: a power switch control signal generation circuit, which is coupled to the power switch, and is configured to operably generate the power switch control signal according to a sampling feedback signal; a feedback signal sample and hold (S/H) circuit, which is coupled between the power switch control signal generation circuit and the primary port, and is configured to operably generate the sampling feedback signal according to coupled feedback signal; and a feedback timer circuit, which is coupled to the power switch control signal generation circuit and the feedback signal S/H circuit, and is configured to operably generate a sampling signal and a clear signal according to the power switch control signal and the coupled feedback signal; wherein the feedback signal S/H circuit converts the coupled feedback signal to the sampling feedback signal according to the sampling signal and the clear signal.

In the aforementioned embodiment, the feedback signal S/H circuit preferably includes: a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and a sampling feedback signal generation circuit, which is coupled between the blanking circuit and the power switch control signal generation circuit, and is configured to operably generate the sampling feedback signal according to the coupled feedback signal, the clear signal, and the sampling signal.

From another perspective, the present invention provides a power switch control circuit of a flyback power converter, wherein the flyback power converter includes a transformer including a primary winding for receiving an input voltage, and a secondary winding for generating an output voltage and an output current; a power switch, which is coupled to the primary winding, the power switch controlling a conduction time of the primary winding; the power switch control circuit, which is located at a primary side of the transformer, the power switch control circuit generating a power switch control signal according to a coupled feedback signal, to control the power switch, and generating a synchronous rectification (SR) pulse signal; a synchronous rectification (SR) switch, which is coupled to the secondary winding, the SR switch controlling a conduction time of the secondary winding in correspondence to a nonconductive time of the primary winding; an SR switch control circuit, which is coupled to the SR switch and located at a secondary side of the transformer, the SR switch control circuit receiving a coupled SR signal to control the SR switch and generating a feedback pulse signal according to the output voltage or the output current in a normal operation mode; and a signal coupler circuit, which is coupled between the SR switch control circuit and the power switch control circuit, the signal coupler circuit sensing the SR pulse signal to generate the coupled SR signal by non-contact coupling without direct connection between the SR pulse signal and the coupled SR signal, and sensing the feedback pulse signal to generate the coupled feedback signal by non-contact coupling without direct connection between the feedback pulse signal and the coupled feedback signal; wherein the signal coupler circuit includes a primary port and a secondary port; wherein the primary port is located at a primary side of the transformer, and the secondary port is located at the secondary side; wherein the primary port receives the SR pulse signal and generates the coupled feedback signal in different and non-overlapping time periods respectively, and the secondary port generates the coupled SR signal and receives the feedback pulse signal in said different and non-overlapping time periods respectively; the power switch control circuit comprising: a power switch control signal generation circuit, which is coupled to the power switch, and is configured to operably generate the power switch control signal according to a sampling feedback signal; a feedback signal sample and hold (S/H) circuit, which is coupled between the power switch control signal generation circuit and the primary port, and is configured to operably generate the sampling feedback signal according to coupled feedback signal; and a feedback timer circuit, which is coupled to the power switch control signal generation circuit and the feedback signal S/H circuit, and is configured to operably generate a sampling signal and a clear signal according to the power switch control signal and the coupled feedback signal; wherein the feedback signal S/H circuit converts the coupled feedback signal to the sampling feedback signal according to the sampling signal and the clear signal.

In one preferable embodiment, the feedback signal S/H circuit preferably includes: a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and a sampling feedback signal generation circuit, which is coupled between the blanking circuit and the power switch control signal generation circuit, and is configured to operably generate the sampling feedback signal according to the coupled feedback signal, the clear signal, and the sampling signal.

In one preferable embodiment, the signal coupler circuit includes a pulse transformer or a pulse opto-coupler, wherein input signals and output signals of the pulse transformer and the pulse opto-coupler are signals in a pulse form.

In one preferable embodiment, the SR pulse signal includes a synchronous rectification (SR) pulse and the coupled SR signal is related to the SR pulse; and wherein the SR switch control circuit turns OFF the SR switch according to the coupled SR signal in an operation period, such that the SR switch is turned OFF before the power switch is turned ON in the operation period.

In one preferable embodiment, the SR switch control circuit determines that the power switch is nonconductive according to a secondary winding current flowing through the secondary winding, an SR switch current flowing through the SR switch, a voltage drop across the secondary winding, or a voltage drop across the SR switch.

In one preferable embodiment, the feedback pulse signal includes at least one feedback pulse, wherein the feedback pulse indicates the output voltage by one or more of followings: a feedback pulse level, a feedback pulse time period, and a number of the feedback pulse(s); and wherein a power switch current flowing through the power switch is controlled in correspondence to the feedback pulse.

In one preferable embodiment, the SR pulse signal includes an SR pulse, and the feedback pulse signal includes a feedback pulse; wherein pulse time periods of the SR pulse and the feedback pulse are both shorter than 1 micro-second.

In one preferable embodiment, the feedback pulse signal includes a feedback pulse, wherein the feedback pulse is generated after a predetermined synchronous period posterior to an SR pulse of the SR pulse signal.

In the aforementioned embodiment, preferably, after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

In the aforementioned embodiment, the synchronous threshold period is preferably related to the output voltage.

In one preferable embodiment, the SR pulse signal includes an SR pulse, wherein the SR pulse is generated after a predetermined feedback period posterior to a feedback pulse of the feedback pulse signal generated in an operation period.

In the aforementioned embodiment, preferably, after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with a synchronous period, till the SR switch control circuit generates the following feedback pulse.

In the aforementioned embodiment, the predetermined feedback period is preferably related to the output voltage.

In one preferable embodiment, the SR switch control circuit includes: an output voltage sampler circuit, configured to operably sample the output voltage, to generate an output voltage sample signal; a feedback pulse signal generation circuit, which is coupled between the output voltage sampler circuit and the secondary port, and is configured to operably generate the feedback pulse signal according to the output voltage sample signal; an SR comparator, which is coupled to the secondary port, and is configured to operably generate a synchronous comparison signal according to the coupled SR signal and a synchronous reference signal; an SR timer circuit, which is coupled to the SR comparator, and is configured to operably generate a predetermined synchronous period timing signal by counting a predetermined synchronous period according to the synchronous comparison signal; and an SR switch control signal generation circuit, which is coupled to the SR comparator and the SR switch, and is configured to operably generate an SR switch control signal according to the synchronous comparison signal, to control the SR switch.

The objectives, technical details, features, and effects of the present invention will be better understood with regard to the detailed description of the embodiments below.

BRIEF DESCRIPTION OF THE DRAWINGS

FIG. 8 shows an embodiment of a power switch control circuit 205 of the present invention.

FIG. 9 shows an embodiment of a feedback signal S/H 2053 of the present invention.

FIG. 10 shows a more specific embodiment of the power switch control circuit 205 of the present invention.

FIG. 11 shows schematic signal waveforms of the SR pulse signal Sync and the blanking signal BLKP in the embodiment shown in FIG. 10 according to the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
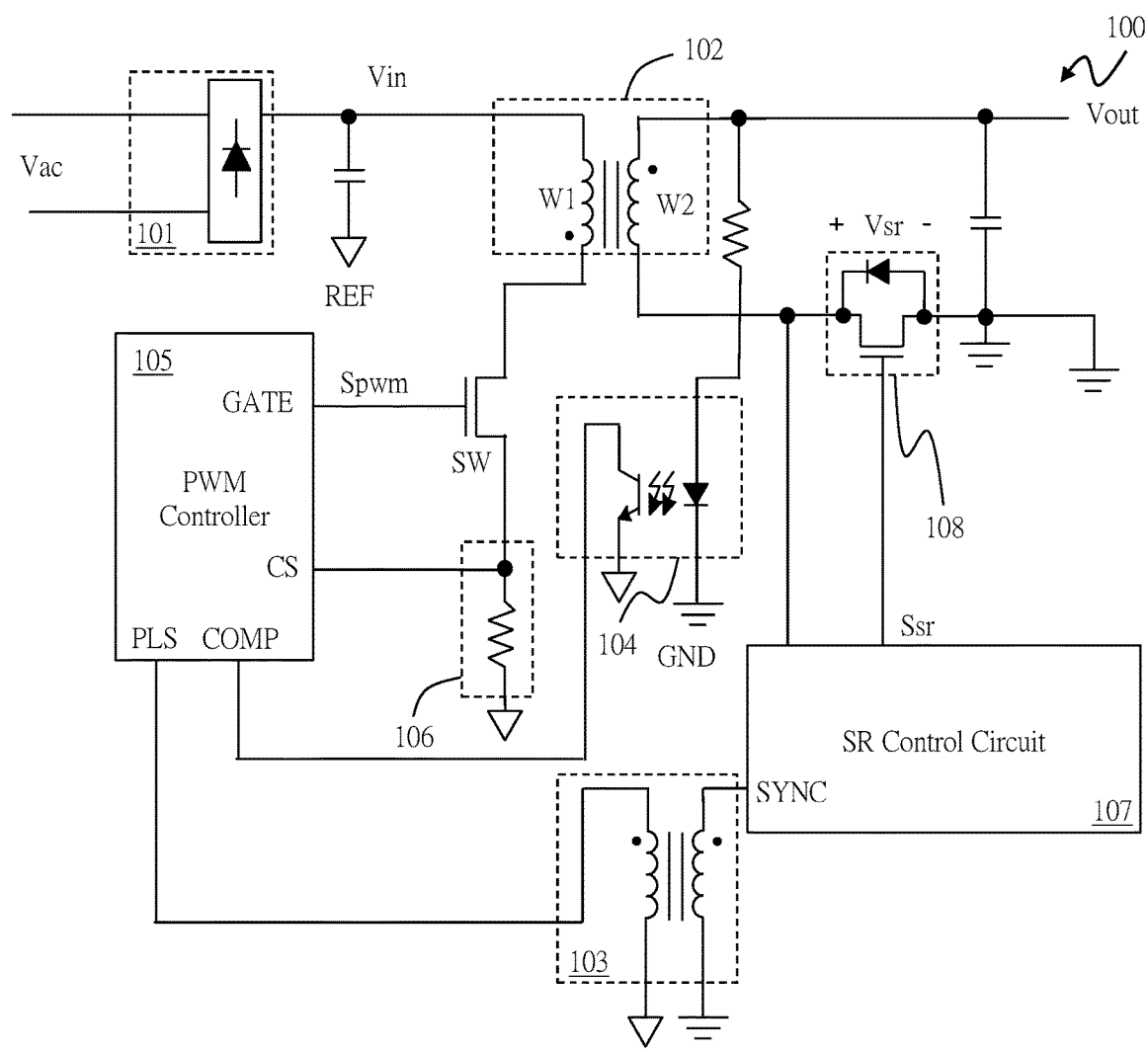
FIG. 1 shows a schematic diagram of a conventional flyback power converter.
Figure 2:
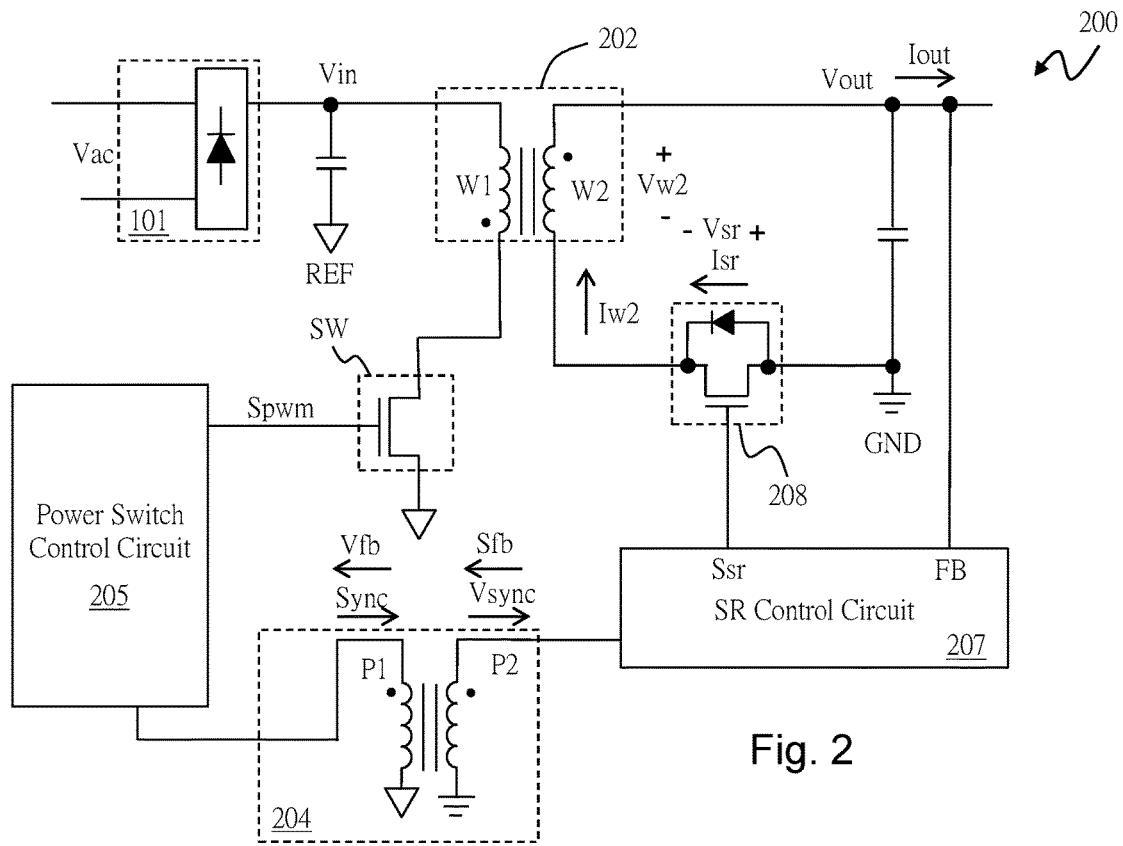
FIG. 2 shows an embodiment of a flyback power converter 200 according to the present invention.

FIG. 2 shows an embodiment of a flyback power converter 200 of the present invention. As shown in FIG. 2, the rectifier circuit 101 rectifies the AC voltage Vac to generate an input voltage Vin. The rectifier circuit 101 is for example but not limited to the bridge rectifier circuit. A primary winding W1 of a transformer 202 in the flyback power converter 200 receives the input voltage Vin. A power switch SW controls a conduction time of the primary winding W1 to convert the input voltage Vin to an output voltage Vout between one end of a secondary winding W2 of the transformer 202 and a ground level GND. The flyback power converter 200 includes the transformer 202, the power switch SW, a signal coupler circuit 204, a power switch control circuit 205, a synchronous rectification (SR) switch control circuit 207, and a synchronous rectification (SR) switch 208. As shown in FIG. 2, the power switch SW is coupled to the primary winding W1, for controlling the conduction time of the primary winding W1. The power switch control circuit 205 is located at a primary side of the transformer 202, for generating a power switch control signal Spwm according to a coupled feedback signal Vfb, to control the power switch SW, and generate a synchronous rectification (SR) pulse signal Sync according to the coupled feedback signal Vfb, wherein the SR pulse signal Sync is related to the power switch control signal Spwm. In one embodiment, the SR pulse signal Sync includes a synchronous pulse; the signal coupler circuit 204 converts this synchronous pulse and transmits information corresponding to this synchronous pulse to the secondary side of the transformer 202, to turn OFF the SR switch 208 before the power switch control signal Spwm turns ON the power switch SW.

In one embodiment, the SR switch 208 is coupled to the secondary winding W2, for controlling the conduction time of the secondary winding W2 in correspondence to the nonconductive time of the primary winding, i.e., for example, the SR switch 208 is turned OFF before the power switch SW is turned ON, and/or the SR switch 208 is turned ON after the power switch SW is turned OFF. In this embodiment, the SR switch control circuit 207 is coupled to the SR switch 208 and located at the secondary side of the transformer 202. In a normal operation mode, the SR switch control circuit 207 receives a coupled SR signal Vsync which is related to the SR pulse signal Sync, and controls the SR switch 208 accordingly; the SR switch control circuit 207 also generates a feedback pulse signal Sfb according to the output voltage Vout or the output current Iout. In one embodiment, the SR switch control circuit 207 controls the SR switch 208 according to the coupled SR signal Vsync to determine the time point of turning OFF the secondary winding W2, and to determine the time point of turning ON the SR switch 208 according to the current Iw2 flowing through the secondary winding W2, the voltage drop Vw2 across the secondary winding W2, the current Isr flowing through the parasitic diode of the SR switch 208, or the voltage drop Vsr across the SR switch 208.

In this embodiment, the signal coupler circuit 204 is coupled between the SR switch control circuit 207 and the power switch control circuit 205; the signal coupler circuit 204 is configured to sense the SR pulse signal Sync to generate the coupled SR signal Vsync by non-contact coupling (i.e., without direct connection between the SR pulse signal Sync and the coupled SR signal Vsync), and to sense the feedback pulse signal Sfb to generate the coupled feedback signal Vfb by non-contact coupling (i.e., without direct connection between the feedback pulse signal Sfb and the coupled feedback signal Vfb). The signal coupler circuit 204 includes a primary port P1 and a secondary port P2, wherein the primary port P1 is located at the primary side of the transformer 202, and the secondary port P2 is located at the secondary side of the transformer 202; the primary port P1 and the secondary port P2 are not in direct connection. The primary port P1 receives the SR pulse signal Sync and generates the coupled feedback signal Vfb in different and non-overlapping time periods respectively, and the secondary port P2 generates the coupled SR signal Vsync and receives the feedback pulse signal Sfb also in the said different and non-overlapping time periods respectively. More specifically, the signal coupler circuit 204 includes the primary port P1 which is electrically connected to the power switch control circuit 205, and the secondary port P2 which is electrically connected to the SR switch control circuit 207. In a first time period, the primary port P1 receives the SR pulse signal Sync and the secondary port P2 generates the coupled SR signal Vsync; in a second time period which is different from and not overlapped with the first time period, the secondary port P2 receives the feedback pulse signal Sfb and the primary port P1 generates the coupled feedback signal Vfb.

Note that, a circuit at the primary side of the transformer 202 means that the circuit is located at the same side with the primary winding W1, and is electrically connected to a reference level REF as is the primary winding W1; and a circuit at the secondary side of the transformer 202 means that the circuit is located at the same side with the secondary winding W2, and is electrically connected to a ground level GND as is the secondary winding W2.

In this embodiment, the signal coupler circuit 204 includes a pulse transformer as shown in the figure. The signal coupler circuit 204 is not limited to the pulse transformer as shown in the figure; the signal coupler circuit 204 may be any circuit capable of transmitting signals bi-directionally between the primary side and the secondary side of the transformer 202 in different and non-overlapping time periods, without direct connection in between, such as a pulse opto-coupler. In a preferable embodiment, input signals and output signals of the aforementioned pulse transformer and the pulse opto-coupler are signals in a pulse form. The feedback pulse signal Sfb and the coupled feedback signal Vfb for example may have corresponding pulses (referred to as feedback pulse(s) hereinafter), wherein the feedback pulse indicates the output voltage by one or more of followings: the level of the feedback pulse (feedback pulse level), the time period of the feedback pulse (feedback pulse time period), and a number of the feedback pulse(s); and, a power switch current flowing through the power switch SW is controlled in correspondence to the feedback pulse (s). That is, the feedback pulse signal Sfb and the coupled feedback signal Vfb are signals in pulse form, and the signal in the pulse form may indicate the level of the output voltage Vout by the level of the pulse, the length of the time period of the pulse, and the number of the pulses; and, the level, pulse width or number of pulse(s) of the coupled feedback signal Vfb is related to the level, pulse width or number of pulse(s) of the feedback pulse signal Sfb.

Figure 13:
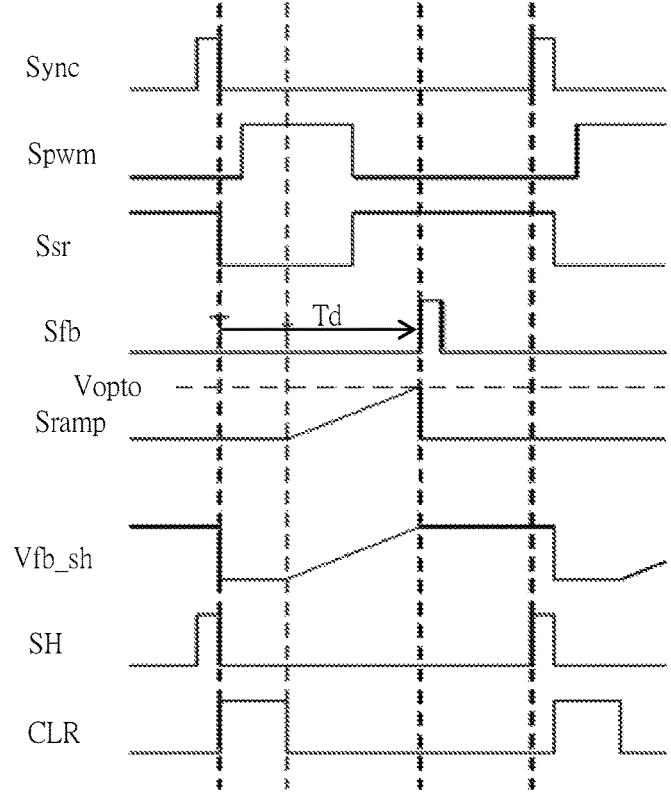
FIG. 13 shows schematic signal waveforms of the SR pulse signal Sync, the power switch control signal Spwm, the SR switch control signal Ssr, the feedback pulse signal Sfb, the voltage Vopto, the ramp signal Sramp, the sample and hold (S/H) signal Vfb_sh, the sampling signal SH, and the clear signal CLR according to the present invention.

In this embodiment, the SR switch control circuit 207 generates the SR switch control signal Ssr according to the coupled SR signal Vsync and, the current Iw2 flowing through the secondary winding W2, the voltage drop Vw2 across the secondary winding W2, the current Isr flowing through the parasitic diode of the SR switch 208, or the voltage drop Vsr across the SR switch 208, to control the SR switch 208. The SR switch is turned OFF according to for example but not limited to a rising edge (or a falling edge as shown in FIG. 13) of a pulse of the coupled SR signal Vsync, and the SR switch 208 is turned ON after the power switch SW is confirmed nonconductive according to the current Iw2 flowing through the secondary winding W2, the voltage drop Vw2 across the secondary winding W2, the current Isr flowing through the parasitic diode of the SR switch 208, or the voltage drop Vsr across the SR switch 208. That is, the SR switch control circuit 207 turns ON the SR switch 208 only after the power switch SW is confirmed nonconductive. The power switch control circuit 205 generates the power switch control signal Spwm according to the coupled feedback signal Vfb, to determine turn ON and OFF the power switch SW, whereby the primary winding W1 is conductive and non-conductive. The present invention is different from the prior art in that, in the present invention, the signal coupling circuit 204 includes the primary port P1 and the secondary port P2, wherein the primary port P1 is located at the primary side of the transformer 202, and the secondary port P2 is located at the secondary side of the transformer 202, i.e., the primary port P1 and the secondary port P2 are not in direct connection; in a first time period, the primary port P1 receives the SR pulse signal Sync and the secondary port P2 generates the coupled SR signal Vsync; in a second time period which is different from and not overlapped with the first time period, the secondary port P2 receives the feedback pulse signal Sfb and the primary port P1 generates the coupled feedback signal Vfb. On the other hand, in the prior art flyback power converter 100, the opto-coupler circuit 104 and the coupler circuit 103 are two different circuits, wherein the opto-coupler circuit 104 transmits information related to the output voltage Vout of the secondary side to the PWM controller 105 at the primary side, while the coupler circuit 103 transmits information related to the power switch control signal GATE at the primary side to the SR control circuit 107 at the secondary side, the opto-coupler circuit 104 and the coupler circuit 103 using individually different ports. More specifically, according to the present invention, in the normal operation mode, the same ports of one signal coupler circuit 204 are used for communicating information between the primary side and the secondary side, and therefore, the space of the flyback power converter 200 can be efficiently reduced, and the manufacturing cost and the size thereof can be reduced. The "normal operation mode" means that the flyback power converter has started up and operates to convert the input voltage Vin to the output voltage Vout.

Figure 3:
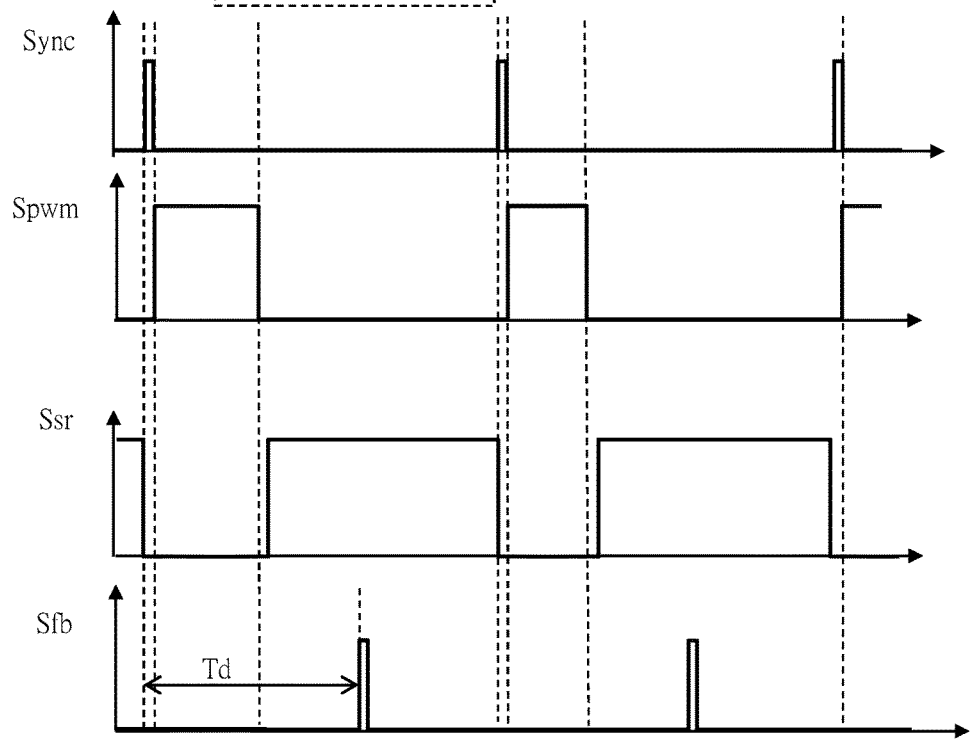
FIG. 3 shows schematic signal waveforms of the synchronous rectification (SR) pulse signal Sync, the power switch control signal Spwm, the SR switch control signal Ssr, and the feedback pulse signal Sfb according to the present invention.

FIG. 3 shows schematic signal waveforms of the synchronous rectification (SR) pulse signal Sync, the power switch control signal Spwm, the SR switch control signal Ssr, and the feedback pulse signal Sfb according to the present invention. As shown in the figure, the power switch control circuit 205 generates the power switch control signal Spwm according to the coupled feedback signal Vfb which is related to the output voltage Vout or the output current Iout, to control the power switch SW, and to generate the SR pulse signal Sync. The SR pulse signal Sync for example includes one or more pulses (referred to as SR pulse (s) hereinafter). In one preferable embodiment, the signal coupler circuit 204 converts the SR pulse and transmits the converted result (the coupled SR signal Vsync) to the SR switch circuit 207, to control the nonconductive timing of the SR switch. That is, the SR switch control circuit 207 turns OFF the SR switch 208 according to the coupled SR signal Vsync, wherein the coupled SR signal Vsync is related to the SR pulse. In one preferable embodiment, after the power switch control circuit 205 generates the SR pulse of the SR pulse signal Sync to turn OFF the SR switch 208, that is, after it is confirmed that the SR switch 208 is nonconductive, the power switch control signal Spwm changes its state to turn ON the power switch. In one preferable embodiment, the SR pulse signal Sync is in pulse form (i.e., the SR pulse signal Sync includes at least one SR pulse), and the feedback pulse signal Sfb is also in pulse form (i.e., the feedback pulse signal Sfb includes at least one feedback pulse), wherein the pulse time periods of the SR pulse and the feedback pulse are both shorter than 1 microsecond.

The SR switch control circuit 207 generates the SR switch control signal Ssr according to the coupled SR signal Vsync, and the current Iw2 flowing through the secondary winding W2, the voltage drop Vw2 across the secondary winding W2, the current Isr flowing through the parasitic diode of the SR switch 208, or the voltage drop Vsr across the SR switch 208 in the normal operation mode. The SR switch control circuit 207 generates the feedback pulse signal Sfb according to the feedback signal FB which is related to the output voltage Vout or the output current Iout in the normal operation mode.

In one embodiment, in an operation period, the feedback pulse of the feedback pulse signal Sfb is generated after a predetermined synchronous period Td posterior to the SR pulse of the SR pulse signal Sync. One operation period is for example a time period between two sequential rising edges of the power switch control signal Spwm. For example, referring to FIG. 3, wherein high level is active and low level is inactive, the SR switch 208 is turned OFF according to a rising edge of the SR pulse signal Sync; and, the SR switch 208 is turned ON by the SR switch control signal Ssr according to the feedback signal FB which is related to the output voltage Vout or the output current Iout, or according to: the current Iw2 flowing through the secondary winding W2, the voltage drop Vw2 across the secondary winding W2, the current Isr flowing through the parasitic diode of the SR switch 208, or the voltage drop Vsr across the SR switch 208. The current flowing through the secondary winding W2 for example may be determined according to the voltage drop across the SR switch 208, or the voltage level of the node at the left side of the SR switch 208. More specifically, in one embodiment, the SR switch control signal Ssr is changed from high level to low level to turn OFF the SR switch 208 before the power switch control signal Spwm changes from low level to high level; and, the SR switch control signal Ssr is changed from low level to high level to turn ON the SR switch 208 according to the coupled SR signal Vsync, and the current Iw2 flowing through the secondary winding W2, the voltage drop Vw2 across the secondary winding W2, the current Isr flowing through the parasitic diode of the SR switch 208, or the voltage drop Vsr across the SR switch 208. In this way, the time points of turning ON and OFF the SR switch 208 can be properly determined. Note that the SR pulse signal Sync and the feedback pulse signal Sfb are delivered to the secondary side and the primary side respectively in different and non-overlapped time periods with the same ports, to determine time points of turning ON and OFF the power switch SW and the SR switch 208, whereby the short through condition can be effectively avoided.

Figure 4A:
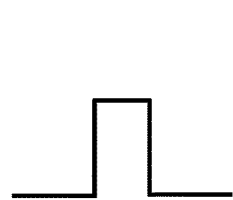
FIGS. 4A-4D show schematic signal waveforms of the SR pulse signal Sync and the feedback pulse signal Sfb in several embodiments according to the present invention.
Figure 4B:
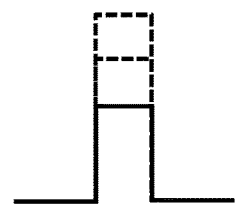
Figure 4C:
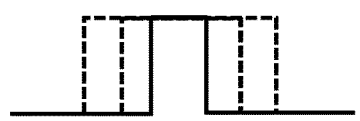
Figure 4D:
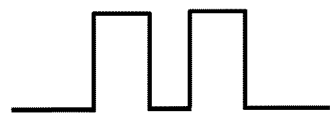

FIGS. 4A-4D shows schematic signal waveforms of the SR pulse signal Sync and the feedback pulse signal Sfb of several embodiments according to the present invention. As shown in FIG. 4A, the SR pulse signal Sync or the feedback pulse signal Sfb may include a single pulse (the SR pulse or the feedback pulse). As shown in FIG. 4B, the single pulse of the SR pulse signal Sync or the feedback pulse signal Sfb may have an adjustable level, wherein the adjustable level of the feedback pulse indicates the level of the output voltage Vout. As shown in FIG. 4C, the single pulse of the SR pulse signal Sync or the feedback pulse signal Sfb may have an adjustable pulse width, wherein the adjustable pulse width of the feedback pulse indicates the level of the output voltage Vout. As shown in FIG. 4D, the SR pulse signal Sync or the feedback pulse signal Sfb may have plural pulse, wherein the number of pulses of the feedback pulse indicates the level of the output voltage Vout.

Figure 5:
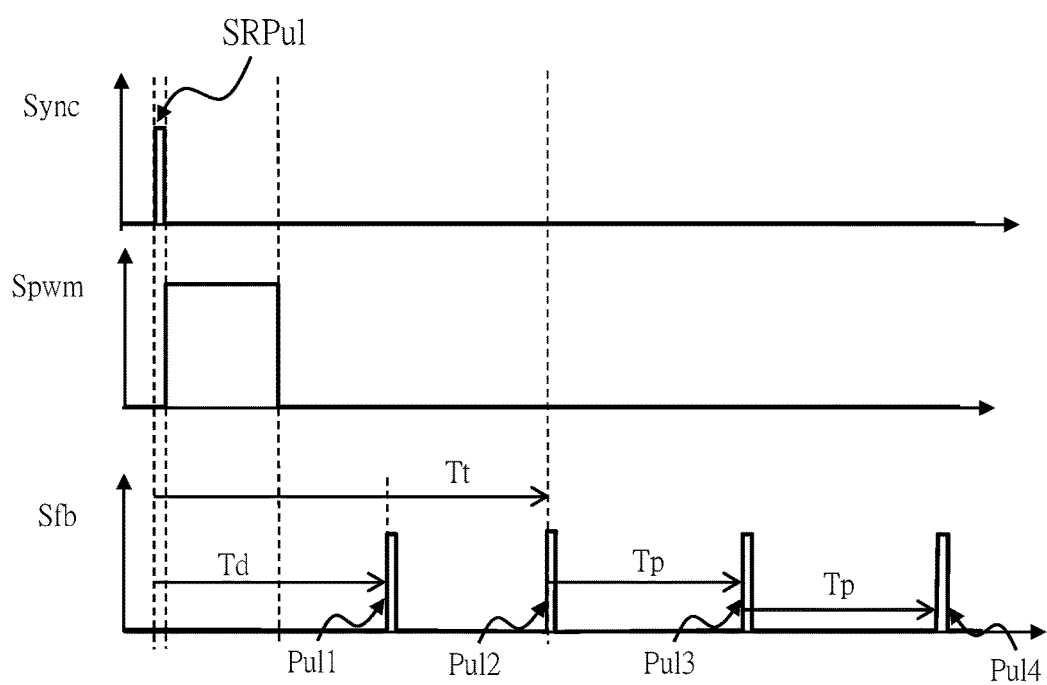
FIG. 5 shows schematic signal waveforms of the SR pulse signal Sync, the power switch control signal Spwm, and the feedback pulse signal Sfb according to the present invention.

FIG. 5 shows schematic signal waveforms of an SR pulse signal Sync, a power switch control signal Spwm, and the feedback pulse signal Sfb according to the present invention. As shown in the figure, the feedback pulse signal Sfb includes a feedback pulse Pul1, wherein the feedback pulse Pul1 is generated after a predetermined synchronous period Td posterior to an SR pulse SRPul of the SR pulse signal Sync. After a previous SR pulse SRPul of the SR pulse signal is generated but a following SR pulse SRPul of the SR pulse signal is not generated for a synchronous threshold period Tt after the previous SR pulse SRPul of the SR pulse signal is generated, the SR switch control circuit 207 generates plural feedback pulse Pul2-Pul4 periodically with a feedback period Tp, till the power switch control circuit 205 generates the following SR pulse SRPul. As thus, the SR switch control circuit 207 can continuously generate the feedback pulses to indicate the output voltage Vout, even at a light load condition (i.e., a load at the output terminal of the flyback power converter 200 consumes only little power). In a preferably embodiment, the synchronous threshold period Tt is related to the output voltage Vout.

Figure 6:
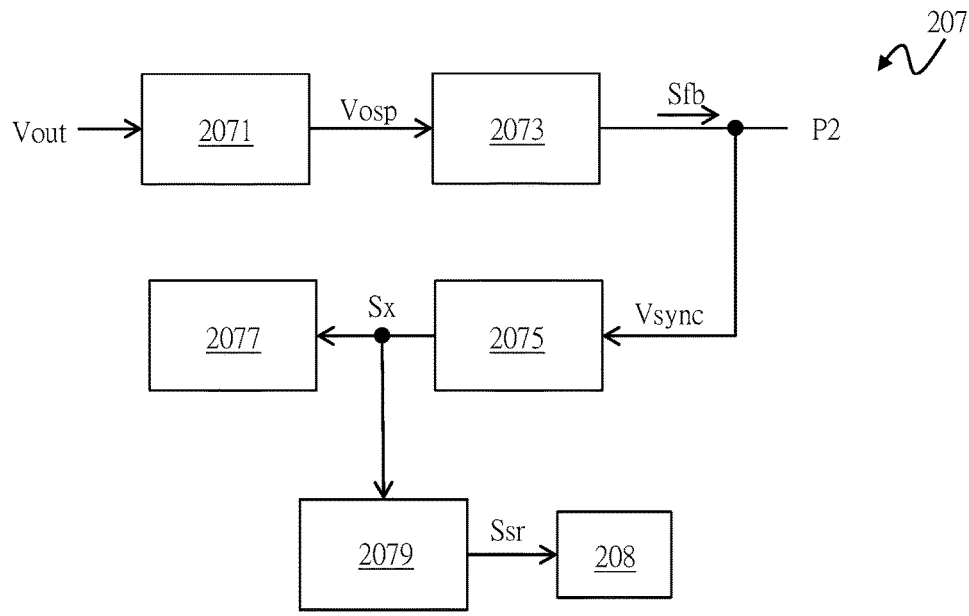
FIG. 6 shows an embodiment of an SR switch control circuit 207 of the present invention.

FIG. 6 shows an embodiment of an SR switch control circuit 207 of the present invention. As shown in FIG. 6, the SR switch control circuit 207 includes: an output voltage sampler circuit 2071, a feedback pulse signal generation circuit 2073, an SR comparator 2075, an SR timer circuit 2077, and an SR switch control signal generation circuit 2079. The output voltage sampler circuit 2071 is configured to sample the output voltage Vout, to generate an output voltage sample signal Vosp. The feedback pulse signal generation circuit 2073 is coupled between the output voltage sampler circuit 2071 and the secondary port P2, and is configured to generate the feedback pulse signal Sfb according to the output voltage sample signal Vosp. The SR comparator 2075 is coupled to the secondary port P2, and is configured to generate a synchronous comparison signal Sx according to the coupled SR signal Vsync and a synchronous reference signal Vth1. The SR timer circuit 2077 is coupled to the SR comparator 2075, and is configured to generate a predetermined synchronous period timing signal by counting a predetermined synchronous period according to the synchronous comparison signal Sx. The SR switch control signal generation circuit 2079 is coupled to the SR comparator 2075 and the SR switch 208, and is configured to generate the SR switch control signal Ssr according to the synchronous comparison signal Sx, to control the SR switch 208.

Figure 7:
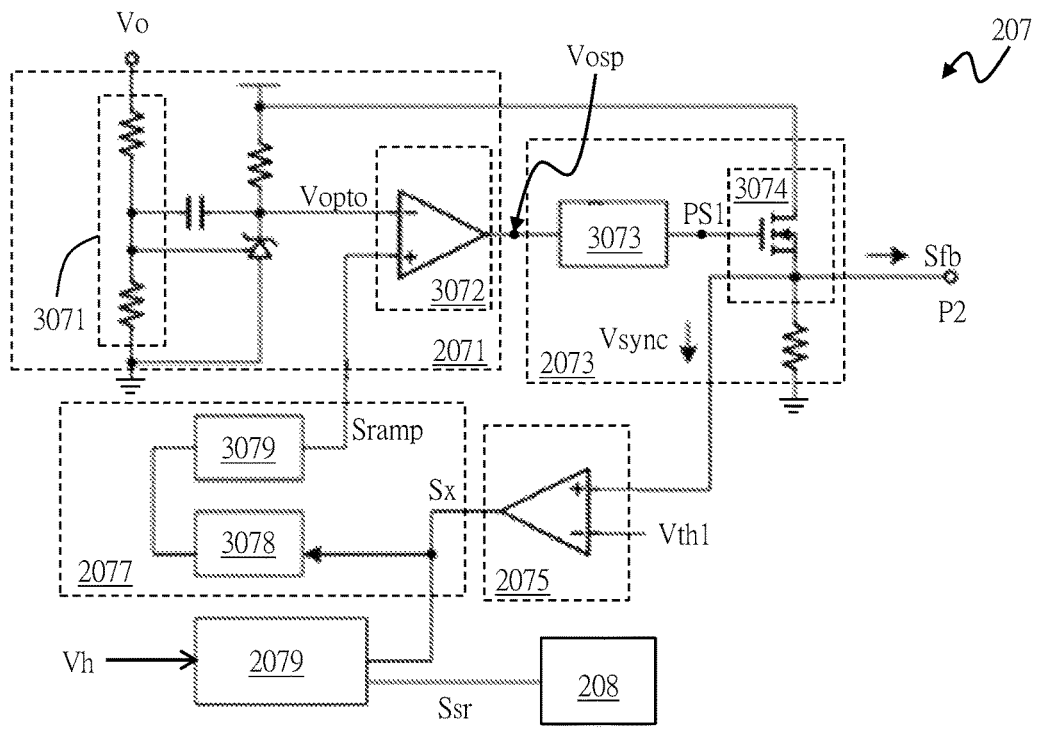
FIG. 7 shows a more specific embodiment of the SR switch control circuit 207 of the present invention.

FIG. 7 shows a more specific embodiment of the SR switch control circuit 207 of the present invention. The SR switch control circuit 207 includes: the output voltage sampler circuit 2071, the feedback pulse signal generation circuit 2073, the SR comparator 2075, the SR timer circuit 2077, and the SR switch control signal generation circuit 2079. The output voltage sampler circuit 2071 is configured to sample the output voltage Vout, to generate the output voltage sample signal Vosp. As shown in the figure, in the output voltage sampler circuit 2071, a voltage divider circuit 3071 receives a voltage Vo related to the output voltage Vout, and generate a division voltage related to the output voltage Vout, whereby the output voltage sampler circuit 2071 generates the output voltage sample signal Vosp according to the voltage Vo. In this embodiment, the output voltage sampler circuit 2071 also includes a comparator 3072, which is configured to comparing a voltage Vopto related to the division voltage of the output voltage Vout with a ramp signal Sramp, to generate the output voltage sample signal Vosp. For example, when the ramp signal Sramp exceeds the voltage Vopto, the comparator 3072 generates a comparison signal with high level. The feedback pulse signal generation circuit 2073 is coupled between the output voltage sampler circuit 2071 and the secondary port P2, and is configured to generate the feedback pulse signal Sfb according to the output voltage sample signal Vosp. The feedback pulse signal generation circuit 2073 includes a pulse circuit 3073, which generates a pulse switch signal PS1 according to the comparison signal with the high level. In this embodiment, the feedback pulse signal generation circuit 2073 also includes a pulse switch 3074, which operates according to the pulse switch signal PS1, to generate the feedback pulse signal Sfb at the secondary port P2.

Still referring to FIG. 7, the SR comparator 2075 is coupled to the secondary port P2, and is configured to generate the synchronous comparison signal Sx according to the coupled SR signal Vsync and a synchronous reference signal Vth1. The SR timer circuit 2077 is coupled to the SR comparator 2075, and is configured to generate the predetermined synchronous period timing signal by counting a predetermined synchronous period according to the synchronous comparison signal Sx. The predetermined synchronous period timing signal is configured to trigger the feedback pulse of the feedback pulse signal Sfb after the predetermined synchronous period Td posterior to the SR pulse of the SR pulse signal Sync. In this embodiment, the SR timer circuit 2077 includes for example but not limited to a delay timer 3078 and a ramp signal generation circuit 3079. The predetermined synchronous period Td is related to the output voltage Vout. The ramp signal generation circuit 3079 is configured to generate the aforementioned ramp signal Sramp, to be inputted to the comparator 3072. The SR switch control signal generation circuit 2079 is coupled to the SR comparator 2075 and the SR switch 208, and is configured to generate the SR switch control signal Ssr according to the synchronous comparison signal Sx, to control the SR switch 208.

FIG. 8 shows an embodiment of a power switch control circuit 205 of the present invention. As shown in the figure, the power switch control circuit 205 includes a power switch control signal generation circuit 2051, a feedback signal sample and hold (S/H) circuit 2053, a feedback timer circuit 2055, and an SR pulse signal generation circuit 2057. The power switch control signal generation circuit 2051 is coupled to the power switch SW, and is configured to generate the power switch control signal Spwm according to a sampling feedback signal COMP. The feedback signal sample and hold (S/H) circuit 2053 is coupled between the power switch control signal generation circuit 2051 and the primary port P1, and is configured to generate the sampling feedback signal COMP according to the coupled feedback signal Vfb. The feedback timer circuit 2055 is coupled to the power switch control signal generation circuit 2051 and the feedback signal S/H circuit 2053, and is configured to generate a sampling signal SH and a clear signal CLR according to power switch control signal Spwm and the coupled feedback signal Vfb.

FIG. 9 shows an embodiment of a feedback signal S/H of 2053 the present invention. As shown in the figure, the feedback signal S/H circuit 2053 includes a blanking circuit 20531 and a sampling feedback signal generation circuit 20533. The blanking circuit 20531 is coupled to the power switch control signal generation circuit 2051 and the primary port P1, and is configured to prevent the feedback signal S/H circuit 2053 from receiving the SR pulse signal Sync from the primary port P1 in a blanking period according to a blanking signal BLKP related to the power switch control signal Spwm. The sampling feedback signal generation circuit 20533 is coupled between the blanking circuit 20531 and the power switch control signal generation circuit 2051, and is configured to generate the sampling feedback signal COMP according to the coupled feedback signal Vfb, the clear signal CLR, and the sampling signal SH.

FIG. 10 shows a more specific embodiment of the power switch control circuit 205 of the present invention. As shown in the figure, the power switch control circuit 205 includes the power switch control signal generation circuit 2051, the feedback signal sample and hold (S/H) circuit 2053, and the feedback timer circuit 2055. The power switch control signal generation circuit 2051 is coupled to the power switch SW, and is configured to generate the power switch control signal Spwm according to the sampling feedback signal COMP. A pulse signal generation circuit 2057 is coupled to the power switch control signal generation circuit 2051, and is configured to generate the SR pulse signal Sync according to the power switch control signal Spwm (in this embodiment, the pulse signal generation circuit 2057 receives a signal related to the power switch control signal Spwm). The feedback signal S/H circuit 2053 is coupled between the power switch control signal generation circuit 2051 and the primary port P1, and is configured to generate the sampling feedback signal COMP according to the coupled feedback signal Vfb. The feedback timer circuit 2055 is coupled to the power switch control signal generation circuit 2051 and the feedback signal S/H circuit 2053, and is configured to generate the sampling signal SH and the clear signal CLR according to power switch control signal Spwm and the coupled feedback signal Vfb (in this embodiment, the feedback timer circuit 2055 for example receives a signal related to the coupled feedback signal Vfb), wherein the feedback signal S/H circuit 2053 converts the coupled feedback signal Vfb to the sampling feedback signal COMP according to the sampling signal SH and the clear signal CLR, and the blanking signal BLKP prevents the feedback signal S/H circuit 2053 from receiving the SR pulse signal Sync from the primary port P1 in the blanking period.

FIG. 11 shows schematic signal waveforms of an SR pulse signal Sync and the blanking signal BLKP of the embodiment shown in FIG. 10 according to the present invention. As shown in FIG. 11, and also referring to FIG. 10, the blanking signal BLKP has a blanking pulse period Tb, and the SR pulse signal Sync has a SR pulse width Ts, wherein the blanking pulse period Tb is longer than the SR pulse width Ts, and the blanking pulse period Tb covers all the SR pulse width Ts. The blanking signal BLKP turns ON a switch SWb such that an inverted input terminal of the blanking circuit 20531 (FIG. 10) in the feedback signal S/H circuit 2053 is electrically connected to the reference voltage REF in all the SR pulse width Ts of the SR pulse signal Sync, whereby the inverted input terminal does not receive the SR pulse signal Sync during the SR pulse width Ts.

Figure 12:
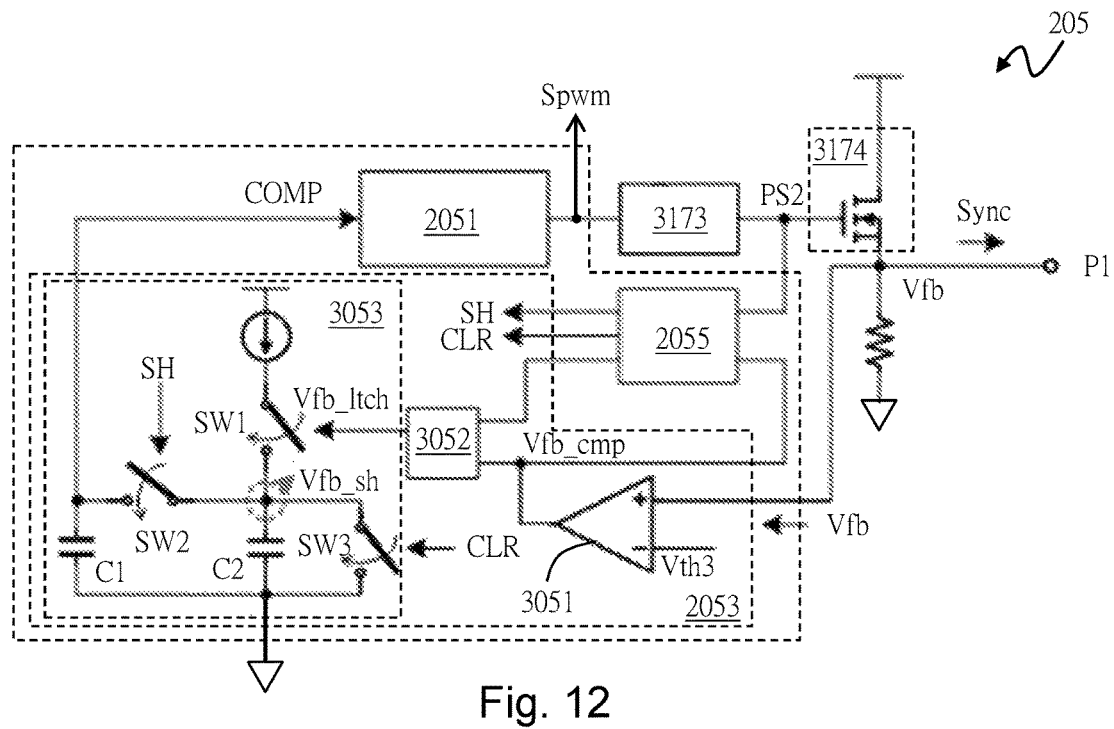
FIG. 12 shows another more specific embodiment of the power switch control circuit 205 of the present invention.

FIG. 12 shows another more specific embodiment of the power switch control circuit 205 of the present invention. As shown in the figure, the power switch control circuit 205 includes the power switch control signal generation circuit 2051, the feedback signal S/H circuit 2053, and the feedback timer circuit 2055. The power switch control signal generation circuit 2051 is coupled to the power switch SW, and is configured to generate the power switch control signal Spwm according to the sampling feedback signal COMP. A pulse circuit 3173 is coupled to the power switch control signal generation circuit 2051, and is configured to generate a pulse switch signal PS2 according to the power switch control signal Spwm. A pulse switch 3174 is coupled to the pulse circuit 3173, and is configured to operating according to the pulse switch signal PS2, to generate the SR pulse signal Sync at the primary port P1. The feedback signal S/H circuit 2053 is coupled between the power switch control signal generation circuit 2051 and the primary port P1, and is configured to generate the sampling feedback signal COMP according to coupled feedback signal Vfb. The feedback timer circuit 2055 is coupled to the power switch control signal generation circuit 2051 and the feedback signal S/H circuit 2053, and is configured to generate the sampling signal SH and the clear signal CLR according to power switch control signal Spwm (in this embodiment, the feedback timer circuit 2055 for example receives the pulse switch signal PS2 related to the power switch signal Spwm) and the coupled feedback signal Vfb (in this embodiment, the feedback timer circuit 2055 for example receives a feedback comparison signal Vfb_cmp related to the coupled feedback signal Vfb), wherein the feedback signal S/H circuit 2053 converts the coupled feedback signal Vfb to the sampling feedback signal COMP according to the sampling signal SH and the clear signal CLR.

Still referring FIG. 12, the feedback signal S/H circuit 2053 for example includes a comparator 3051, a latch circuit 3052, and a sample and hold (S/H) circuit 3053. The comparator 3051 compares the coupled feedback signal Vfb with a feedback reference signal Vth3, to generate the feedback comparison signal Vfb_cmp. The latch circuit 3052 generates a latch feedback signal Vfb_ltch according to the feedback comparison signal Vfb_cmp. As shown in the figure, the S/H circuit 3053 generates the sampling feedback signal COMP according to the latch feedback signal Vfb_ltch, the sampling signal SH and the clear signal CLR. A switch SW1 is controlled by the latch feedback signal Vfb_ltch which is generated by the latch circuit 3052 and is related to the coupled feedback signal Vfb, and switches SW2 and SW3 are controlled by the sampling signal SH and the clear signal CLR respectively, to charge and discharge capacitors C1 and C2, so as to generate a sample and hold signal Vfb_sh, and further to generate the sampling feedback signal COMP. The feedback timer circuit 2055 is coupled to the power switch control signal generation circuit 2051 and the feedback signal S/H circuit 2053, and is configured to generate the sampling signal SH and the clear signal CLR according to power switch control signal Spwm (in this embodiment, the feedback timer circuit 2055 for example receives the pulse switch signal PS2 related to the power switch signal Spwm) and the coupled feedback signal Vfb (in this embodiment, the feedback timer circuit 2055 for example receives a feedback comparison signal Vfb_cmp related to the coupled feedback signal Vfb).

FIG. 13 shows schematic signal waveforms of the SR pulse signal Sync, the power switch control signal Spwm, the SR switch control signal Ssr, the feedback pulse signal Sfb, the voltage Vopto, the ramp signal Sramp, the sample and hold (S/H) signal Vfb_sh, the sampling signal SH, and the clear signal CLR according to the present invention. As shown in the figure, the power switch control circuit 205 generates the power switch control signal Spwm according to the coupled feedback signal Vfb which is related to the output voltage Vout or the output current Iout, to control the power switch SW, so as to generate the SR pulse signal Sync. The SR pulse signal Sync for example includes an SR pulse. In one preferable embodiment, the SR pulse is converted and delivered to the SR switch circuit 207 by the signal coupler circuit 204, to control the nonconductive timing of the SR switch. The SR switch control circuit 207 turns OFF the SR switch 208 according to the coupled SR signal Vsync, wherein the coupled SR signal Vsync is related to the SR pulse. In one preferable embodiment, after the power switch control circuit 205 generates the SR pulse of the SR pulse signal Sync to turn OFF the SR switch 208, i.e., after confirming that the SR switch 208 is nonconductive, the level of the power switch control signal Spwm is changed to turn ON the power switch. In one preferable embodiment, the SR pulse signal Sync has at least one SR pulse, and the feedback pulse signal Sfb has at least one feedback pulse, wherein the pulse time periods of the SR pulse and the feedback pulse are both shorter than 1 microsecond.

Note that, in this embodiment, in the operation period, the feedback pulse of the feedback pulse signal Sfb is generated after the predetermined synchronous period Td posterior to the SR pulse of the SR pulse signal Sync. The predetermined synchronous period Td is determined according to the voltage Voptp, the ramp signal Sramp, and a pulse width of the clear signal CLR, such that the predetermined synchronous period Td is related to the output voltage Vout.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistor or the voltage divider circuit is not limited to a circuit formed by passive devices, but it may be formed by other circuits, such as transistors. For another example, inverted and non-inverted input terminals of the error amplifier circuit or the comparator circuit are interchangeable, with corresponding amendments of the circuits processing these signals. For another example, when an external signal of the controller (for example but not limited to the feedback signal) is obtained and processed inside the controller, the signal may be subject to a voltage-to-current conversion, a current-to-voltage conversion, or/and a ratio conversion, etc., and therefore, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the pulse switch 3074 shown in FIG. 7 can be applied to other embodiments, such as the embodiment shown in FIG. 10. In view of the foregoing, the spirit of the present invention should cover all such and other modifications and variations, which should be interpreted to fall within the scope of the following claims and their equivalents.

What is claimed is:

1. A flyback power converter, comprising:
a transformer, which includes:
   a primary winding, configured to operably receive an input voltage; and
   a secondary winding, configured to operably generate an output voltage and an output current;
a power switch, which is coupled to the primary winding, and configured to operably control a conduction time of the primary winding;
a power switch control circuit, which is located at a primary side of the transformer, and configured to operably generate a power switch control signal according to a coupled feedback signal, to control the power switch, and configured to operably generate a synchronous rectification (SR) pulse signal;
a synchronous rectification (SR) switch, which is coupled to the secondary winding, and configured to operably control a conduction time of the secondary winding in correspondence to a nonconductive time of the primary winding;
a synchronous rectification (SR) switch control circuit, which is coupled to the SR switch and located at a secondary side of the transformer, and configured to operably receive a coupled SR signal to control the SR switch and configured to operably generate a feedback pulse signal according to the output voltage or the output current in a normal operation mode; and
a signal coupler circuit, which is coupled between the SR switch control circuit and the power switch control circuit, and is configured to operably sense the SR pulse signal to generate the coupled SR signal by non-contact coupling without direct connection between the SR pulse signal and the coupled SR signal, and sense the feedback pulse signal to generate the coupled feedback signal by non-contact coupling without direct connection between the feedback pulse signal and the coupled feedback signal;
wherein the signal coupler circuit includes a primary port and a secondary port;
wherein the primary port is located at the primary side of the transformer, and the secondary port is located at the secondary side of the transformer;
wherein the primary port receives the SR pulse signal and generates the coupled feedback signal in different and non-overlapping time periods respectively, and the secondary port generates the coupled SR signal and receives the feedback pulse signal in said different and non-overlapping time periods respectively.

2. The flyback power converter of claim 1, wherein the signal coupler circuit includes a pulse transformer or a pulse opto-coupler, wherein input signals and output signals of the pulse transformer and the pulse opto-coupler are signals in a pulse form.

3. The flyback power converter of claim 1, wherein the SR pulse signal includes a synchronous rectification (SR) pulse and the coupled SR signal is related to the SR pulse; and wherein the SR switch control circuit turns OFF the SR switch according to the coupled SR signal in an operation period, such that the SR switch is turned OFF before the power switch is turned ON in the operation period.

4. The flyback power converter of claim 1, wherein the SR switch control circuit determines that the power switch is nonconductive according to a secondary winding current flowing through the secondary winding, an SR switch current flowing through the SR switch, a voltage drop across the secondary winding, or a voltage drop across the SR switch.

5. The flyback power converter of claim 1, wherein the feedback pulse signal includes at least one feedback pulse, wherein the feedback pulse indicates the output voltage by one or more of followings: a feedback pulse level, a feedback pulse time period, and a number of the feedback pulse(s); and wherein a power switch current flowing through the power switch is controlled in correspondence to the feedback pulse.

6. The flyback power converter of claim 1, wherein the SR pulse signal includes an SR pulse, and the feedback pulse signal includes a feedback pulse; wherein pulse time periods of the SR pulse and the feedback pulse are both shorter than 1 micro-second.

7. The flyback power converter of claim 1, wherein the feedback pulse signal includes a feedback pulse, wherein the feedback pulse is generated after a predetermined synchronous period posterior to an SR pulse of the SR pulse signal.

8. The flyback power converter of claim 7, wherein after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

9. The flyback power converter of claim 7, wherein the synchronous threshold period is related to the output voltage.

10. The flyback power converter of claim 1, wherein the SR pulse signal includes an SR pulse, wherein the SR pulse is generated after a predetermined feedback period posterior to a feedback pulse of the feedback pulse signal generated in an operation period.

11. The flyback power converter of claim 10, wherein after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with asynchronous period, till the SR switch control circuit generates the following feedback pulse.

12. The flyback power converter of claim 10, wherein the predetermined feedback period is related to the output voltage.

13. The flyback power converter of claim 1, wherein the SR switch control circuit includes:
   an output voltage sampler circuit, configured to operably sample the output voltage, to generate an output voltage sample signal;
   a feedback pulse signal generation circuit, which is coupled between the output voltage sampler circuit and the secondary port, and is configured to operably generate the feedback pulse signal according to the output voltage sample signal;
   an SR comparator, which is coupled to the secondary port, and is configured to operably generate a synchronous comparison signal according to the coupled SR signal and a synchronous reference signal;

an SR timer circuit, which is coupled to the SR comparator, and is configured to operably generate a predetermined synchronous period timing signal by counting a predetermined synchronous period according to the synchronous comparison signal; and an SR switch control signal generation circuit, which is coupled to the SR comparator and the SR switch, and is configured to operably generate an SR switch control signal according to the synchronous comparison signal, to control the SR switch.

14. The flyback power converter of claim 1, wherein the power switch control circuit includes:

a power switch control signal generation circuit, which is coupled to the power switch, and is configured to operably generate the power switch control signal according to a sampling feedback signal;

a feedback signal sample and hold (S/H) circuit, which is coupled between the power switch control signal generation circuit and the primary port, and is configured to operably generate the sampling feedback signal according to coupled feedback signal; and a feedback timer circuit, which is coupled to the power switch control signal generation circuit and the feedback signal S/H circuit, and is configured to operably generate a sampling signal and a clear signal according to the power switch control signal and the coupled feedback signal;

wherein the feedback signal S/H circuit converts the coupled feedback signal to the sampling feedback signal according to the sampling signal and the clear signal.

15. The flyback power converter of claim 14, wherein the feedback signal S/H circuit includes:

a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and a sampling feedback signal generation circuit, which is coupled between the blanking circuit and the power switch control signal generation circuit, and is configured to operably generate the sampling feedback signal according to the coupled feedback signal, the clear signal, and the sampling signal.

16. A synchronous rectification (SR) switch control circuit of a flyback power converter, wherein the flyback power converter includes a transformer including a primary winding for receiving an input voltage, and a secondary winding for generating an output voltage and an output current; a power switch, which is coupled to the primary winding, the power switch controlling a conduction time of the primary winding; a power switch control circuit, which is located at a primary side of the transformer, the power switch control circuit generating a power switch control signal according to a coupled feedback signal, to control the power switch, and generating a synchronous rectification (SR) pulse signal; a synchronous rectification (SR) switch, which is coupled to the secondary winding, the SR switch controlling a conduction time of the secondary winding in correspondence to a nonconductive time of the primary winding; the SR switch control circuit, which is coupled to the SR switch and located at a secondary side of the transformer, the SR switch control circuit receiving a coupled SR signal to control the SR switch and generating a feedback pulse signal according to the output voltage or the output current in a normal operation mode; and a signal coupler circuit, which is coupled between the SR switch control circuit and the power switch control circuit, the signal coupler circuit sensing the SR pulse signal to generate the coupled SR signal by non-contact coupling without direct connection between the SR pulse signal and the coupled SR signal, and sensing the feedback pulse signal to generate the coupled feedback signal by non-contact coupling without direct connection between the feedback pulse signal and the coupled feedback signal; wherein the signal coupler circuit includes a primary port and a secondary port; wherein the primary port is located at a primary side of the transformer, and the secondary port is located at the secondary side; wherein the primary port receives the SR pulse signal and generates the coupled feedback signal in different and non-overlapping time periods respectively, and the secondary port generates the coupled SR signal and receives the feedback pulse signal in said different and non-overlapping time periods respectively; the SR switch control circuit comprising:

an output voltage sampler circuit, configured to operably sample the output voltage, to generate an output voltage sample signal;

a feedback pulse signal generation circuit, which is coupled between the output voltage sampler circuit and the secondary port, and is configured to operably generate the feedback pulse signal according to the output voltage sample signal;

an SR comparator, which is coupled to the secondary port, and is configured to operably generate a synchronous comparison signal according to the coupled SR signal and a synchronous reference signal;

an SR timer circuit, which is coupled to the SR comparator, and is configured to operably generate a predetermined synchronous period timing signal by counting a predetermined synchronous period according to the synchronous comparison signal; and an SR switch control signal generation circuit, which is coupled to the SR comparator and the SR switch, and is configured to operably generate an SR switch control signal according to the synchronous comparison signal, to control the SR switch.

17. The SR switch control circuit of claim 16, wherein the signal coupler circuit includes a pulse transformer or a pulse opto-coupler, wherein input signals and output signals of the pulse transformer and the pulse opto-coupler are signals in a pulse form.

18. The SR switch control circuit of claim 16, wherein the SR pulse signal includes a synchronous rectification (SR) pulse and the coupled SR signal is related to the SR pulse; and wherein the SR switch control circuit turns OFF the SR switch according to the coupled SR signal in an operation period, such that the SR switch is turned OFF before the power switch is turned ON in the operation period.

19. The SR switch control circuit of claim 16, wherein the SR switch control circuit determines that the power switch is nonconductive according to a secondary winding current flowing through the secondary winding, an SR switch current flowing through the SR switch, a voltage drop across the secondary winding, or a voltage drop across the SR switch.

20. The SR switch control circuit of claim 16, wherein the feedback pulse signal includes at least one feedback pulse, wherein the feedback pulse indicates the output voltage by one or more of followings: a feedback pulse level, a feedback pulse time period, and a number of the feedback pulse (s); and wherein a power switch current flowing through the power switch is controlled in correspondence to the feedback pulse.

21. The SR switch control circuit of claim 16, wherein the SR pulse signal includes an SR pulse, and the feedback pulse signal includes a feedback pulse; wherein pulse time periods of the SR pulse and the feedback pulse are both shorter than 1 micro-second.

22. The SR switch control circuit of claim 16, wherein the feedback pulse signal includes a feedback pulse, wherein the feedback pulse is generated after a predetermined synchronous period posterior to an SR pulse of the SR pulse signal.

23. The SR switch control circuit of claim 22, wherein after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

24. The SR switch control circuit of claim 22, wherein the synchronous threshold period is related to the output voltage.

25. The SR switch control circuit of claim 16, wherein the SR pulse signal includes an SR pulse, wherein the SR pulse is generated after a predetermined feedback period posterior to a feedback pulse of the feedback pulse signal generated in an operation period.

26. The SR switch control circuit of claim 25, wherein after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with asynchronous period, till the SR switch control circuit generates the following feedback pulse.

27. The SR switch control circuit of claim 25, wherein the predetermined feedback period is related to the output voltage.

28. The SR switch control circuit of claim 16, wherein the power switch control circuit includes:
a power switch control signal generation circuit, which is coupled to the power switch, and is configured to operably generate the power switch control signal according to a sampling feedback signal;
a feedback signal sample and hold (S/H) circuit, which is coupled between the power switch control signal generation circuit and the primary port, and is configured to operably generate the sampling feedback signal according to coupled feedback signal; and
a feedback timer circuit, which is coupled to the power switch control signal generation circuit and the feedback signal S/H circuit, and is configured to operably generate a sampling signal and a clear signal according to the power switch control signal and the coupled feedback signal;
wherein the feedback signal S/H circuit converts the coupled feedback signal to the sampling feedback signal according to the sampling signal and the clear signal.

29. The SR switch control circuit of claim 28, wherein the feedback signal S/H circuit includes:
a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and
a sampling feedback signal generation circuit, which is coupled between the blanking circuit and the power switch control signal generation circuit, and is configured to operably generate the sampling feedback signal according to the coupled feedback signal, the clear signal, and the sampling signal.

30. A power switch control circuit of a flyback power converter, wherein the flyback power converter includes a transformer including a primary winding for receiving an input voltage, and a secondary winding for generating an output voltage and an output current; a power switch, which is coupled to the primary winding, the power switch controlling a conduction time of the primary winding; the power switch control circuit, which is located at a primary side of the transformer, the power switch control circuit generating a power switch control signal according to a coupled feedback signal, to control the power switch, and generating a synchronous rectification (SR) pulse signal; a synchronous rectification (SR) switch, which is coupled to the secondary winding, the SR switch controlling a conduction time of the secondary winding in correspondence to a nonconductive time of the primary winding; an SR switch control circuit, which is coupled to the SR switch and located at a secondary side of the transformer, the SR switch control circuit receiving a coupled SR signal to control the SR switch and generating a feedback pulse signal according to the output voltage or the output current in a normal operation mode; and a signal coupler circuit, which is coupled between the SR switch control circuit and the power switch control circuit, the signal coupler circuit sensing the SR pulse signal to generate the coupled SR signal by non-contact coupling without direct connection between the SR pulse signal and the coupled SR signal, and sensing the feedback pulse signal to generate the coupled feedback signal by non-contact coupling without direct connection between the feedback pulse signal and the coupled feedback signal; wherein the signal coupler circuit includes a primary port and a secondary port; wherein the primary port is located at a primary side of the transformer, and the secondary port is located at the secondary side; wherein the primary port receives the SR pulse signal and generates the coupled feedback signal in different and non-overlapping time periods respectively, and the secondary port generates the coupled SR signal and receives the feedback pulse signal in said different and non-overlapping time periods respectively; the power switch control circuit comprising:
a power switch control signal generation circuit, which is coupled to the power switch, and is configured to operably generate the power switch control signal according to a sampling feedback signal;
a feedback signal sample and hold (S/H) circuit, which is coupled between the power switch control signal generation circuit and the primary port, and is configured to operably generate the sampling feedback signal according to coupled feedback signal; and
a feedback timer circuit, which is coupled to the power switch control signal generation circuit and the feedback signal S/H circuit, and is configured to operably generate a sampling signal and a clear signal according to the power switch control signal and the coupled feedback signal;

wherein the feedback signal S/H circuit converts the coupled feedback signal to the sampling feedback signal according to the sampling signal and the clear signal.

31. The power switch control circuit of claim 30, wherein the feedback signal S/H circuit includes:
  a blanking circuit, which is coupled to the power switch control signal generation circuit and the primary port, and is configured to operably prevent the feedback signal S/H circuit from receiving the SR pulse signal from the primary port in a blanking period according to a blanking signal related to the power switch control signal; and
  a sampling feedback signal generation circuit, which is coupled between the blanking circuit and the power switch control signal generation circuit, and is configured to operably generate the sampling feedback signal according to the coupled feedback signal, the clear signal, and the sampling signal.

32. The power switch control circuit of claim 30, wherein the signal coupler circuit includes a pulse transformer or a pulse opto-coupler, wherein input signals and output signals of the pulse transformer and the pulse opto-coupler are signals in a pulse form.

33. The power switch control circuit of claim 30, wherein the SR pulse signal includes a synchronous rectification (SR) pulse and the coupled SR signal is related to the SR pulse; and wherein the SR switch control circuit turns OFF the SR switch according to the coupled SR signal in an operation period, such that the SR switch is turned OFF before the power switch is turned ON in the operation period.

34. The power switch control circuit of claim 30, wherein the SR switch control circuit determines that the power switch is nonconductive according to a secondary winding current flowing through the secondary winding, an SR switch current flowing through the SR switch, a voltage drop across the secondary winding, or a voltage drop across the SR switch.

35. The power switch control circuit of claim 30, wherein the feedback pulse signal includes at least one feedback pulse, wherein the feedback pulse indicates the output voltage by one or more of followings: a feedback pulse level, a feedback pulse time period, and a number of the feedback pulse (s); and wherein a power switch current flowing through the power switch is controlled in correspondence to the feedback pulse.

36. The power switch control circuit of claim 30, wherein the SR pulse signal includes an SR pulse, and the feedback pulse signal includes a feedback pulse; wherein pulse time periods of the SR pulse and the feedback pulse are both shorter than 1 micro-second.

37. The power switch control circuit of claim 30, wherein the feedback pulse signal includes a feedback pulse, wherein the feedback pulse is generated after a predetermined synchronous period posterior to an SR pulse of the SR pulse signal.

38. The power switch control circuit of claim 37, wherein after a previous SR pulse of the SR pulse signal is generated but a following SR pulse of the SR pulse signal is not generated for a synchronous threshold period after the previous SR pulse of the SR pulse signal is generated, the SR switch control circuit generates plural feedback pulses periodically with a feedback period, till the power switch control circuit generates the following SR pulse.

39. The power switch control circuit of claim 37, wherein the synchronous threshold period is related to the output voltage.

40. The power switch control circuit of claim 30, wherein the SR pulse signal includes an SR pulse, wherein the SR pulse is generated after a predetermined feedback period posterior to a feedback pulse of the feedback pulse signal generated in an operation period.

41. The power switch control circuit of claim 40, wherein after a previous feedback pulse of the feedback pulse signal is generated but a following feedback pulse of the feedback pulse signal is not generated for a predetermined feedback period after the previous feedback pulse of the feedback pulse signal is generated, the power switch control circuit generates plural SR pulses periodically with a synchronous period, till the SR switch control circuit generates the following feedback pulse.

42. The power switch control circuit of claim 40, wherein the predetermined feedback period is related to the output voltage.

43. The power switch control circuit of claim 30, wherein the SR switch control circuit includes:
  an output voltage sampler circuit, configured to operably sample the output voltage, to generate an output voltage sample signal;
  a feedback pulse signal generation circuit, which is coupled between the output voltage sampler circuit and the secondary port, and is configured to operably generate the feedback pulse signal according to the output voltage sample signal;
  an SR comparator, which is coupled to the secondary port, and is configured to operably generate a synchronous comparison signal according to the coupled SR signal and a synchronous reference signal;
  an SR timer circuit, which is coupled to the SR comparator, and is configured to operably generate a predetermined synchronous period timing signal by counting a predetermined synchronous period according to the synchronous comparison signal; and
  an SR switch control signal generation circuit, which is coupled to the SR comparator and the SR switch, and is configured to operably generate an SR switch control signal according to the synchronous comparison signal, to control the SR switch.

* * * * *